(12) United States Patent
Shoroff et al.

(10) Patent No.: US 7,398,295 B2
(45) Date of Patent: Jul. 8, 2008

(54) VIRTUAL LOBBY FOR DATA CONFERENCING

(75) Inventors: Srikanth Shoroff, Sammamish, WA (US); Ryan Haveson, Monroe, WA (US)

(73) Assignee: Microsoft Corporation, Redmond, WA (US)

(*) Notice: Subject to any disclaimer, the term of this patent is extended or adjusted under 35 U.S.C. 154(b) by 855 days.

(21) Appl. No.: 10/611,382

(22) Filed: Jun. 30, 2003

(65) Prior Publication Data

US 2004/0267938 A1 Dec. 30, 2004

(51) Int. Cl.
*G06F 15/16* (2006.01)

(52) U.S. Cl. .................. 709/204; 709/206; 709/229

(58) Field of Classification Search ......... 709/204–207, 709/229; 715/753
See application file for complete search history.

(56) References Cited

U.S. PATENT DOCUMENTS 6,668,288 B1* 12/2003 Midwinter et al. ............ 710/29

| | | | |
|---|---|---|---|
| 6,961,418 B1* | 11/2005 | Thygeson et al. | 379/210.01 |
| 2002/0059587 A1* | 5/2002 | Cofano et al. | 725/35 |
| 2002/0103864 A1* | 8/2002 | Rodman et al. | 709/204 |
| 2004/0003046 A1* | 1/2004 | Grabelsky et al. | 709/206 |

* cited by examiner

*Primary Examiner*—William C. Vaughn, Jr.
*Assistant Examiner*—Yemane Mesfin
(74) *Attorney, Agent, or Firm*—Perkins Coie LLP

(57) ABSTRACT

Allowing external computing systems to access a data conference with low risk of eavesdropping. An external computing system accesses a virtual lobby before joining the data conference. The virtual lobby is an object that may include a list of computing systems admitted to the lobby. An external computing system joins the lobby when it is included in a waiting list associated with the lobby. Being joined to the lobby does not allow full access to the live data exchanges in the data conference, but does facilitate functions that are less sensitive such as notifying a conference organizer that the joined party in the lobby would like to join the data conference. Upon receiving notice that an external computing system has joined the lobby, the conference organizer then provides further authorization for the external computing system to enter the data conference using any number of in-band or out-of-band mechanisms.

24 Claims, 3 Drawing Sheets

VIRTUAL LOBBY FOR DATA CONFERENCING

BACKGROUND OF THE INVENTION

1. The Field of the Invention

The present invention relates to data conferencing. More particularly, the present invention relates to securely facilitating data conferencing between computing systems in an intranet and computing system in an external network.

2. Background and Related Art

Computing and networking technology has transformed the way we work and play. Networks have become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

One application of particular significance in a network environment is data conferencing. Data conferencing involves the on-line real time exchange of data. Data conferencing is often employed in conjunction with audio and/or video conferencing, and may include any exchange of real-time information that is the subject of real-time multi-party communications. For example, whiteboard drawings may be drawn by one party to the data conference and displayed to the other parties in the data conference in a process referred to in the field as "whiteboarding". "Whiteboarding" refers to a data conferencing application (such as MICROSOFT NETMEETING) that is often based on T.120 standards. In addition, a common document may be mutually edited by a number of remote conferencing users using common application sharing applications, such as those found as part of the T.120 standard. Data conferencing is particularly flexible in that any type of information may be exchanged as is suitable for the data conferencing application. Voice and audio information may also be exchanged over data networks.

One issue in any conference is that that access to the conference needs to be controlled, particularly in conferences in which sensitive information is to be conveyed. In many types of conferences, there is an inherent level of security enabled by the form of conference itself. For example, absent extensive impersonation efforts, access to physical in-person conferences or meetings may be controlled since typically individual participants recognize those other participants who are in attendance, or the person may at least present credentials and thereby be physically recognized prior to entering the conference. If there is an uninvited person in the conference, that person may be recognized as uninvited, and excused from the conference, or simply refused admittance. Similarly, a video conference allows individuals to establish a high degree of confidence in the identity of each other by the human ability to visually recognize familiar faces, although the ability to observe can sometimes be somewhat more limited in a video conference as compared to an in-person conference. Furthermore, there are cases in which a person has never seen the video conferencing participant before. In such a case, that person would not have a basis for visually recognizing that participant. A telephone conference allows individuals to recognize each other by voice recognition although there is further opportunity for eavesdropping, and it is not guaranteed that a given individual would have heard the voice of another participant before the teleconference. In data conferencing, the data itself may provide little or even no information that allows each other to authenticate themselves. Accordingly, there is significant risk of eavesdropping in data conferencing.

One method for securing against eavesdropping is to authenticate each data conferencing participant at the time the participant joins the data conference. This works particularly well when all of the participants are within a common intranet or other trusted network administered by a common entity since secure and consistent authentication schemes may be employed within a common network.

However, oftentimes, computing systems that are external to the intranet are to communicate in the data conference. To enable this, a conference organizer may establish a conferencing object that has a certain conference identifier. In this description and in the claims, an "object" is an instance of a class that defines properties and methods associated with the class. The conference organizer or the conferencing server may establish a password required to enter the conference. The conference organizer or conferencing server then communicates the conference time, conference identifier, and password to the designated invitees of the conference. This communication may be, for example, an instant message, an e-mail, a telephone call, an SMS message, or the like. The external participant logs in at the designated time by providing the conference identifier and password. The external participant is then provided access to the data conference.

This method for allowing external participants permits some level of security. However, the conference identifier and password may sometimes be transmitted in the clear and thus is subject to unintended interception. These uninvited parties may then be permitted access to the conference against the will of the conference organizer. Accordingly, what would be advantageous are mechanisms in which invited external participants may join a data conference while providing better protection against eavesdropping.

BRIEF SUMMARY OF THE INVENTION

The foregoing problems with the prior state of the art are overcome by the principles of the present invention which are directed towards a method for allowing external computing systems to access a data conference. The external computing system first accesses a virtual lobby before joining the data conference. The virtual lobby is an object that may include a list of computing systems admitted to the virtual lobby. An external computing system joins the virtual lobby when it is included in a waiting list associated with the virtual lobby.

Being joined to the lobby does not allow full access to the live data exchanges in the data conference. However, being joined to the lobby does result in functions that are less sensitive such as notifying a conference organizer that the joined party in the lobby would like to join the data conference. If appropriate, the conference organizer (or another party delegated the task of approving external data conference participants) may then provide authorization for the external computing system to enter the data conference. At that point, the external computing system is granted access to the data conference.

There may be some small amount of security involved with joining the lobby. For example, in order to join the lobby, the external computing system may be required to provide at least a conference identifier and an associated password. Alternatively, a conference identifier may be all that is provided. The conference organizer or other delegated computing system may impose another level of security prior to admitting the external computing system to the data conference. For example, the user of the conferencing organizing computing system may telephone the user of the external computing system desiring access to verify by voice recognition that the request is indeed from a trusted party to the data conference. Alternatively, the conference organizer may provide a special security token to the external computing system. The external computing system may then provide that token, or a derivative thereof, to the lobby server as a condition for the external computing system being granted access to the data conference. The derivative of the security token may be a signature or other structure that only an invited party would be able to construct even given access to the security token.

Accordingly, the data conference may have greater and more flexible levels of security when involving participating computing systems from outside the intranet. In particular, the risk of an unwanted party eavesdropping in on a data conference is reduced, even if the data conference includes some participants that are outside of the sphere of trust. Accordingly, corporations and other participating computing systems from different trust spheres may data conference with reduced fear of eavesdropping.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
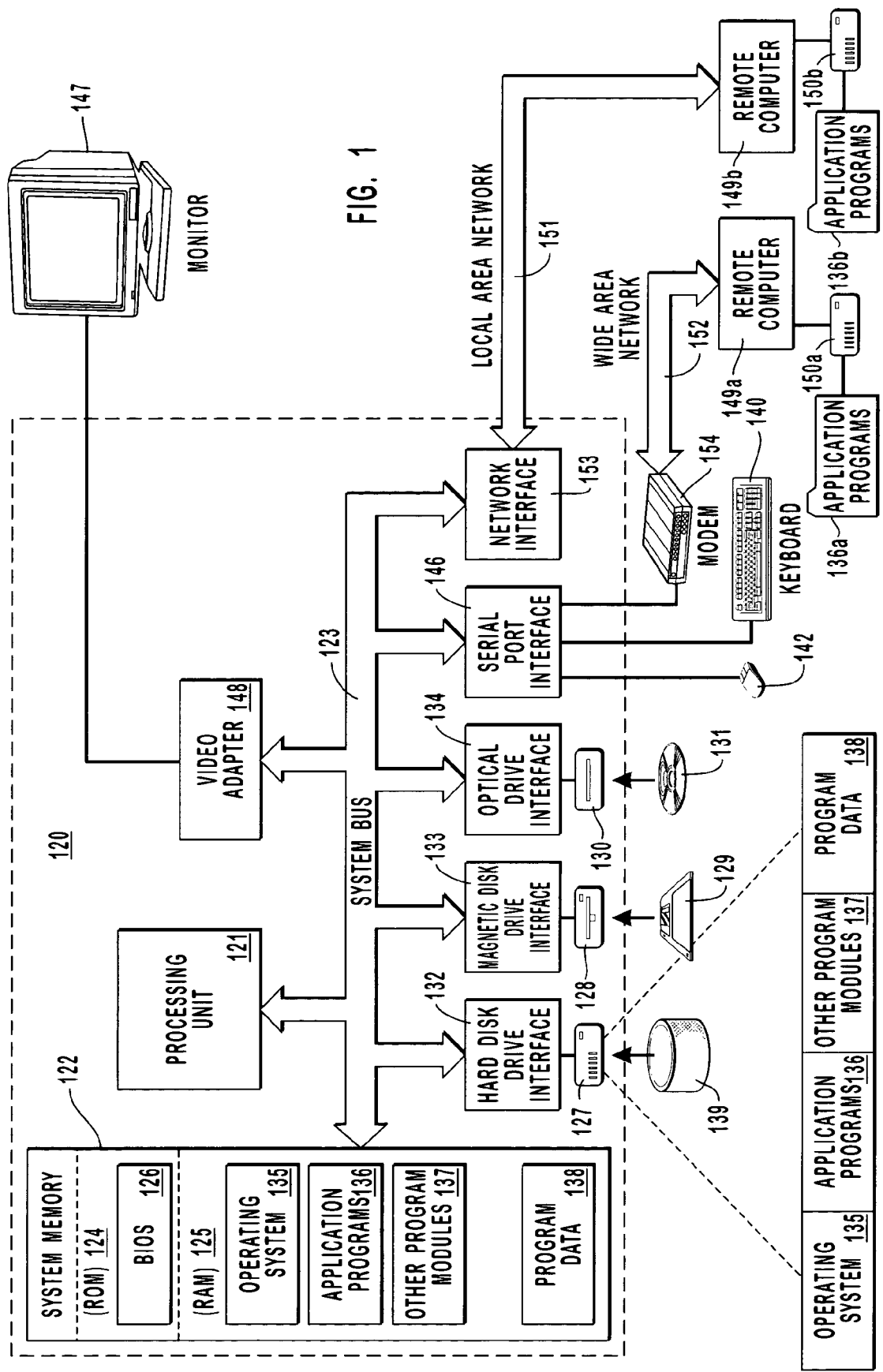
FIG. 1 illustrates a suitable computing system that may implement the features of the present invention.

The principles of the present invention relate to mechanisms in which an external computing system may access a virtual lobby before joining a data conference. The virtual lobby is an object that may include a list of computing systems admitted to the lobby. An external computing system joins the lobby when it is included in a waiting list associated with the lobby. Upon receiving notice that an external computing system has joined the lobby, the conference organizer then provides authorization for the external computing system to enter the data conference.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. The computer-readable media may include persistent memory or storage media, or may include volatile memory as is often used in system memory.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates suitable computing environment in which the principles of the present invention may be employed in the form of a computer 120. The computer 120 includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any computing system may implement the features of the present invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
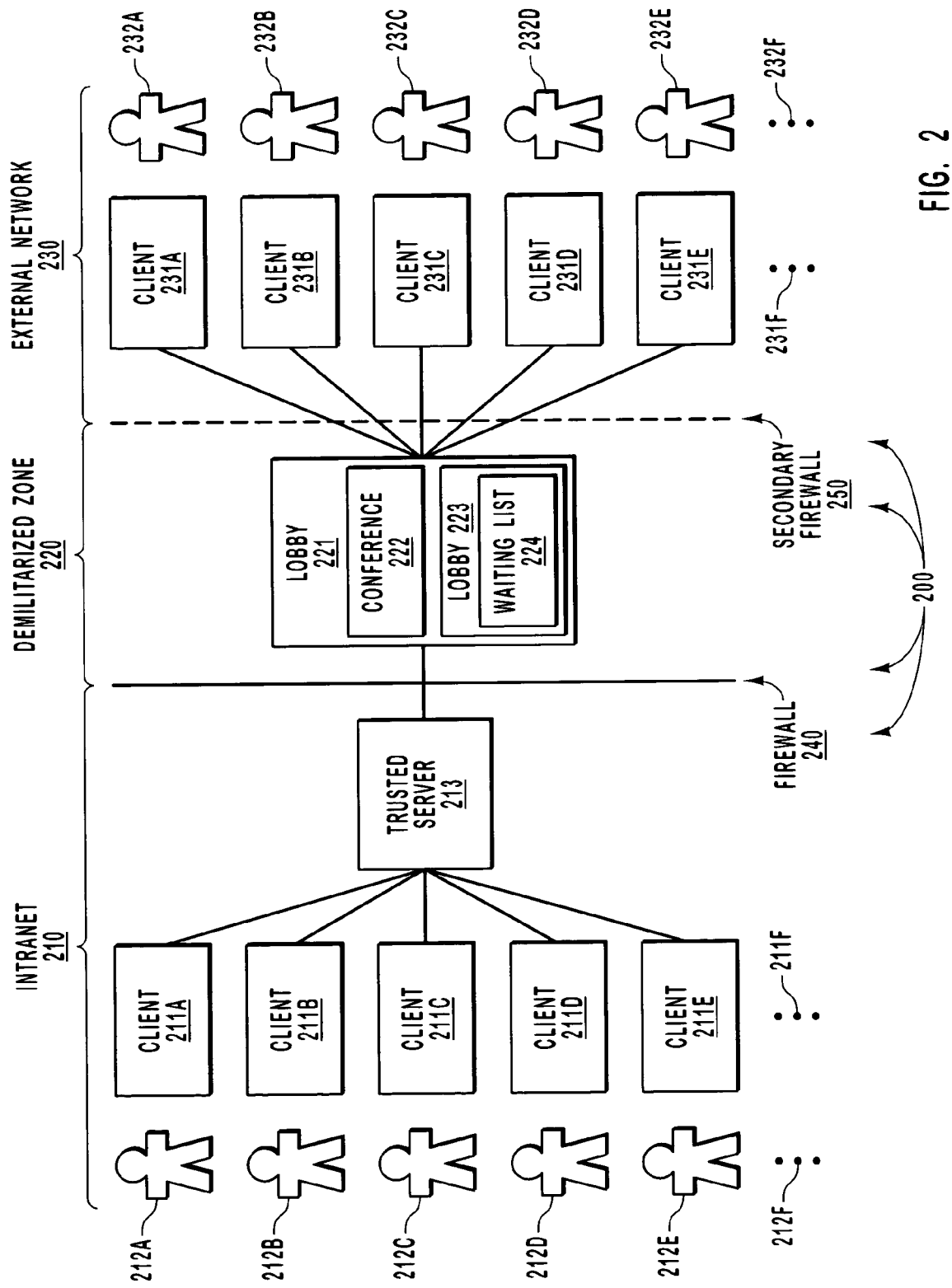
FIG. 2 illustrates a network environment in which the principles of the present invention may be employed.

FIG. 2 illustrates network environment 200 in which the principles of the present invention may be employed. The network environment 200 includes an intranet 210. In this description and in the claims, an "intranet" is any network that restricts at some level the flow of electronic traffic from outside the network through the use of one or more firewalls. For example, the intranet 210 is protected by firewall 240. An intranet may include a single computing system, several computing systems, an entire corporate network or portion thereof, or other enterprise network or portions thereof, or partnered networks from two or more corporations and/or enterprises or portions thereof.

As an example only, the intranet 210 is illustrated as including client computing systems 211A through 211E among potentially many more as represented by the vertical ellipses 211F. These client computing systems have corresponding users 212A through 212E among potentially many more as represented by the vertical ellipses 212F. A trusted server 213 within the intranet provides services to the various client computing systems and users within the intranet 210. Any computing system within the intranet 210 (whether the client computing systems 211A through 211F or trusted server 213) will also be referred to herein generally as an "intranet computing system".

The network environment 200 also includes an external network 230. In this description and in the claims, an "external network" when mentioned in the context of an "intranet" means that portion of a network (e.g., the entire Internet) whose traffic is subject to restriction when incoming to the intranet. For example, communications from computing systems within the external network 230 are subject to restriction by firewall 240 when communicating to the computing systems within the intranet 210. A computing system within the external network 230 may, or may not, be behind its own firewall, and thus be part of its own intranet. Even so, computing systems on the external network 230, whether or not they are in their own intranet, still have their incoming traffic restricted by firewall 240, and are thus part of an external network with respect to the intranet 210.

As an example only, the external network 230 is illustrated as including client computing systems 231A through 231E among potentially many more as represented by the vertical ellipses 231F. These client computing systems have corresponding users 232A through 232E among potentially many more as represented by the vertical ellipses 232F. If the external network is the Internet, as may often be the case, there may be enormous numbers of client computing systems that have the capability of sending electronic traffic towards computing systems in the intranet, hence the need for the firewall 240. Any computing system within the external network 230 (e.g., any of client computing systems 231A through 231F) will also be referred to herein generally as an "external computing system".

Between the intranet 210 and the external network 230 is a buffer zone often referred to in the art as a demilitarized zone 220. A demilitarized zone is also referred to in the art as a "DMZ". In this case, however, the demilitarized zone 220 includes a lobby server 221 that is capable of creating and managing an in-memory object in the form of a lobby object 223. The lobby server may also optionally be capable of creating and managing an in-memory object in the form of a conference object 222. Alternatively, the lobby and conference objects 222 and 223 may be managed by created and managed by the trusted server, or may be managed in a distributed manner using one of more computing systems in the demilitarized zone 220 and one or more computing systems in the intranet 210.

The lobby server may optionally be protected from incoming traffic by a secondary firewall 250, which may provide some restriction of incoming traffic, but will at least allow a portion of those computing systems in the external network to communicate with the lobby server 221 to facilitate the principles of the present invention. The intranet 210 is more protected than the lobby server 221 due to the firewall 240. The lobby server 221 acts as a virtual lobby where requests to access a data conference may be parked without access to the data conference until there has been adequate assurance that it is appropriate for the requestor to attend the data conference. In this sense, the lobby server 221 does act as a virtual lobby and thereby is called a "lobby server" though the lobby server 221 may also be capable of performing other general-purpose processing. Each of the computing systems 211A through 211F, 231A through 231F, and lobby server 221 may be any computing system. As an example only, the computing systems may have the structure described above for the computer 120 of FIG. 1, although that by no means need be the case.

Figure 3:
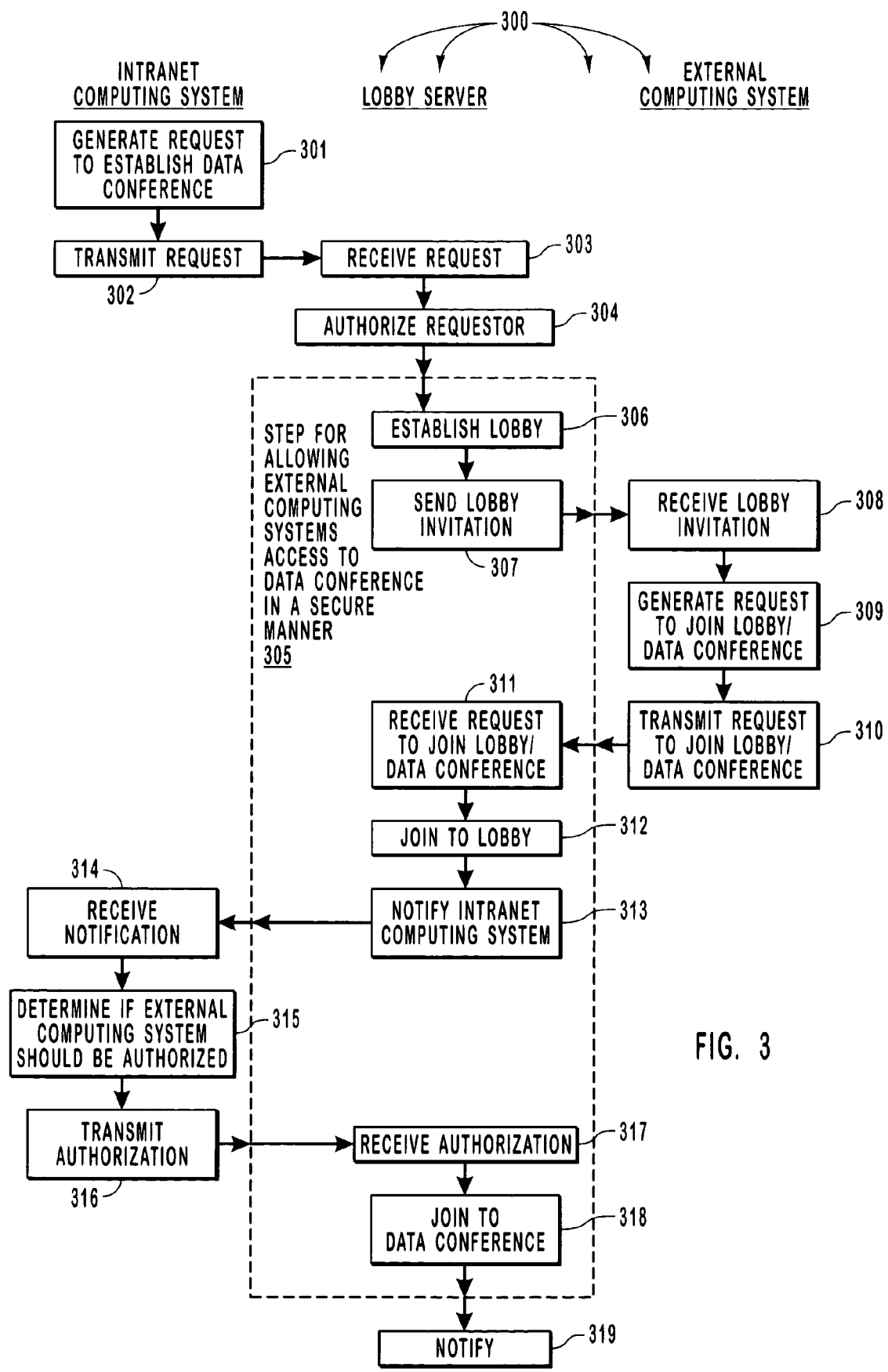
FIG. 3 illustrates a method for allowing an external computing system access to a data conference in accordance with the principles of the present invention.

FIG. 3 illustrates a flowchart of a method 300 for an external computing system to gain access to a data conference established by a conference organizing computing system in the intranet in accordance with the principles of the present invention. The method is performed by cooperative interaction between an intranet computing system, the lobby server and an external computing system desiring access to the conference.

The acts that may be performed by the intranet computing system are illustrated in the left column of FIG. 3 under the header "INTRANET COMPUTING SYSTEM. The acts and step that may be performed by the lobby server 220 are illustrated in the middle column of FIG. 3 under the header "LOBBY SERVER". The acts that may be performed by the external computing system are illustrated in the right column of FIG. 3 under the header "EXTERNAL COMPUTING SYSTEM". The method 300 of FIG. 3 may be performed in the network environment 200 of FIG. 2. Accordingly, the method 300 will now be described with frequent reference to the network environment 200 of FIG. 2 for illustrative purposes.

The intranet computing system may first generate a request to establish a data conference (act 301), and then transmits the request such that at least a derivative of the request is received by the lobby server (act 302). In the case of the scheduled conference, the request may be transmitted well in advance of the conference. In the case of the ad-hoc conference, the request may be transmitted only shortly before the conference. The intranet computing system that generates and transmits this request will also be referred to as a conference organizing computing system. For example, suppose that the client computing system 211A is the conference organizing computing system, the associated user 212A may have the responsibility of organizing the data conference.

The request to establish the data conference may include any information helpful to organize the data conference. Examples of helpful information include the conference date and time, the anticipated conference duration, a list of automatically authorized attendees that need not use the lobby in order to attend the data conference, potentially a list of attendees that may not attend the data conference unless they first passed through the lobby, and optionally a request to establish an associated telephone conference with the data conference.

Upon receiving the request (act 303), the lobby server 221 (or other authorizing computing system) determines that the conference organizing computing system is authorized to establish the data conference (act 304). Incidentally, if the requester was not authorized to establish the data conference, the lobby server 221 may take appropriate action such as not complying with the request and potentially notifying individuals as appropriate or as designated by a system administrator. The lobby server 221 may then store the information about the conference received in the request.

The lobby server 221 then performs a functional, result-oriented step for allowing access to one or more potential participating computing systems in the external network to the data conference in a secure manner (step 305). This functional, result-oriented step may be accomplished by any corresponding acts that in combination accomplish this result. However, in the illustrated embodiment, this step includes corresponding acts 306, optionally act 307, act 311, act 312, act 313, act 317 and 318.

Specifically, the lobby server 221 establishes a lobby object 223 that may be joined by potential participating computing systems in the external network (act 306). The lobby object 213 may instead not be established up front, but perhaps only after having received the first request from an external computing system to join the lobby in act 311 described below. The lobby object 223 may also include an associated waiting list 224 that represents a list of computing systems and/or users that have joined the lobby awaiting approval to enter the data conference. The lobby object is an object or group of objects that permits authorization of potential participating computing systems in the external network without directly allowing access to the subject data of the data conference. Optionally, the lobby may be established only if there are authorized external computing systems identified within the conference establishment request. The lobby server may also at this time establish the data conference object either itself or in collaboration with another intranet computing system such as trusted server 213, or may cause the trusted server 213 to establish the data conference.

Optionally, the lobby server 221 sends (or causes to be sent) a lobby invitation to the participants including the external computing system that desires access to the conference (act 307). In one embodiment, the lobby server 221 sends an extensible Markup Language (XML) element or elements to the conference organizing computing system. The XML element or elements may include information such as a password and conference identifier that would be required to join the lobby. The conference organizing computing system may then e-mail or otherwise transmit a lobby invitation with any other information (e.g., conference identifier and password) to the external computing system(s) that desires to access the data conference.

The external computing system desiring access to the data conference then receives the invitation to join the lobby (act 308). The external computing system then generates a request to join the lobby and/or data conference (act 309). That request may include any credentials needed to join the lobby (e.g., conference identifier and password) if any. The external computing system then transmits the request to join the lobby and/or data conference to the lobby server (act 310).

Upon receiving this request (act 311), the lobby server determines that the external computing system is authorized to join the lobby. This determination may be based on some low level of security such as, for example, the external computing system supplying the correct conference identifier and/or password. Alternatively, the lobby server may admit any computing system to the lobby so long as they simply assert that they are a computing system that matches a list of external participants that are authorized to attend the data conference. It may even be that any computing system that requests admission to the lobby is granted admission to the lobby. The lobby server may make this determination for multiple external computing systems.

If the lobby server 221 determines that the external computing system is authorized to join the lobby, the lobby server 221 joins the external computing system to the lobby (act 312). The lobby server then notifies an intranet computing system (which may or may not be the conference organizing computing system) that the external computing system has requested access to the data conference (act 313) and/or has joined the lobby.

Upon receiving the notification (act 314), the intranet computing system determines that the external computing system is authorized to attend the data conference (act 315) and then transmits the authorization such that at least a derivative of the authorization is received by the lobby server (act 316). The lobby server receives the authorization (act 317) and then joins the external computing system to the data conference (act 318). The lobby server may then notify one, some, or all of the participants, that the external computing system has joined the data conference (act 319), whereupon the external computing system may participate in the data conference.

The intranet computing system properly verifies that any computing system in the waiting list in the lobby server is authorized to attend the data conference prior to being admitted to the data conference. Accordingly, the intranet computing system may use any authentication mechanism that it is comfortable with in verifying the identity and propriety of admitting those in the lobby into the full data conference. The user of the external computing system may, for example, call the user of the external computing system that is waiting in the lobby to verify identity. Alternatively, the lobby server may facilitate an electronic authentication mechanism in which the external computing system provides a digital signature to the lobby server. Additionally, the external server may (with or without the lobby server's assistance) challenge the intranet computing system such that the intranet computing system may likely only successfully achieve the challenge if they are on an invitation list or if they are the party it claims it is.

Accordingly, a higher level of security is achieved when engaging in data conferencing even if some of the participants in the data conference are external computing systems. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A method for establishing a data conference between one or more intranet computing systems and one or more external computing systems, the method comprising:
   receiving a request at a lobby server to establish a data conference from a conference organizing computing system in an intranet, wherein the lobby server is logically in a demilitarized zone between the intranet and an external network;
   determining that the conference organizing computing system is authorized to establish the data conference;
   establishing a lobby in the demilitarized zone to which potential participating computing systems in the external network are admitted awaiting authorization to join the data conference; and
   subsequent to establishing the lobby,
   receiving a request to join the data conference from a potential participating computing system in the external network;
   admitting the requesting potential participating computing system to the lobby;
   notifying the conference organizing computing system that the requesting potential participating computing system has requested to join the data conference;
   receiving an indication from an intranet computing system that the requesting potential participating computing system is authorized to join the data conference; and
   subsequent to receiving the indication, joining the requesting potential participating computing system to the data conference;
   wherein the potential participating computing system in the external network requesting to join the data conference is placed in a lobby until the conference organizing computing system indicates that the potential participating computer system is authorized to join the data conference.

2. The method of claim 1 further comprising determining that the potential participating computing system is allowed to be admitted to the lobby.

3. The method of claim 2 wherein determining that the potential participating computing system is allowed to be admitted to the lobby comprises:
   determining that the potential participating computing system has properly provided a conference identifier corresponding to the data conference.

4. The method of claim 3 wherein determining that the potential participating computing system is allowed to be admitted to the lobby further comprises:
   determining that the potential participating computing system has properly provided a password corresponding to the data conference.

5. The method of claim 2 wherein determining that the potential participating computing system is allowed to be admitted to the lobby comprises:
   determining that the potential participating computing system has properly provided a password corresponding to the data conference.

6. The method of claim 1 wherein the indication that the potential participating computer system is authorized to join the data conference is received from the conference organizing computing system.

7. The method of claim 6 further comprising facilitating communication between the conference organizing computing system and the potential computing system in order to determine whether the potential participating computing system is authorized to join the data conference.

8. The method of claim 1 wherein the indication that the potential participating computer system is authorized to join the data conference is received from an intranet computing system other than the conference organizing computing system.

9. The method of claim 8 further comprising facilitating communication between the intranet computing system and the potential computing system in order to determine whether the potential participating computing system is authorized to join the data conference.

10. A computer-readable storage medium comprising instructions that, when executed by a lobby server that is logically located within a buffer zone between an intranet and an external network, cause the lobby server to:

receive a request to establish a data conference from a conference organizing computing system in the intranet;

determine whether the conference organizing computing system is authorized to establish the data conference;

establish a lobby within the buffer zone to which potential participating computing systems in the external network are admitted to await authorization to join the data conference;

intercede a request to join the data conference from a potential participating computing system in the external network;

admit the potential participating computing system to the lobby;

notify the conference organizing computing system that the potential participating computing system has requested to join the data conference;

receive an indication from an intranet computing system that the potential participating computing system is authorized to join the data conference; and subsequent to receiving the indication, join the potential participating computing system to the data conference.

11. The computer-readable storage medium of claim 10 wherein the computer readable storage medium is system memory.

12. The computer-readable storage medium of claim 10 wherein the computer readable storage medium is persistent memory.

13. The computer-readable storage medium of claim 10 wherein the computer-readable storage medium further comprising instructions that, when executed by the lobby server, cause the lobby server to:

prior to admitting the potential participating computer system to the lobby, determine whether the potential participating computing system is allowed to be admitted to the lobby.

14. The computer-readable storage medium of claim 13 wherein the instructions that cause the lobby server to determine whether the potential participating computing system is allowed to be admitted to the lobby comprise instructions that, when executed by the lobby server, cause the lobby server to:

determine whether the potential participating computing system has properly provided a conference identifier corresponding to the data conference.

15. The computer-readable storage medium of claim 14 wherein the instructions that cause the lobby server to determine whether the potential participating computing system is allowed to be admitted to the lobby further comprise instructions that, when executed by the lobby server, cause the lobby server to:

determine whether the potential participating computing system has properly provided a password corresponding to the data conference.

16. The computer-readable storage medium of claim 13 wherein the instructions that cause the lobby server to determine whether the potential participating computing system is allowed to be admitted to the lobby comprise instructions that, when executed by the lobby server, cause the lobby server to:

determine whether the potential participating computing system has properly provided a password corresponding to the data conference.

17. The computer-readable storage medium of claim 10 wherein the indication that the potential participating computing system is authorized to join the data conference is received from the conference organizing computing system.

18. The computer-readable storage medium of claim 17 further comprising instructions that, when executed by the lobby server, cause the lobby server to facilitate communication between the conference organizing computing system and the potential computing system in order to determine whether the potential participating computing system is authorized to join the data conference.

19. The computer-readable storage medium of claim 10 wherein the indication that the potential participating computing system is authorized to join the data conference is received from an intranet computing system other than the conference organizing computing system.

20. A system comprising:

an intranet;

a lobby server that establishes a data conference in response to receiving a request from a conference organizing computing system to establish a data conference for an intranet computing system and a computing system in an external network, wherein the lobby server is located within a demilitarized zone between the intranet and the external network;

wherein, in response to receiving a request to join the data conference from the computing system in the external network, the lobby server performs a method comprising:

notifying the conference organizing computing system that the computing system in the external network has requested to join the data conference;

admitting the computing system in the external network to a lobby located within the demilitarized zone to which potential participating computing systems in external network are admitted awaiting authorization to join the data conference;

in response to receiving an indication that the computing system is authorized to join the data conference, joining the computing system to the data conference.

21. The system of claim 20 wherein the method performed by the lobby server further comprises subsequent to joining the computing system to the data conference, transmitting by the lobby server a notification to the conference organizing system that the computing system in the external network has joined the data conference.

22. The system of claim 20 wherein the method performed by the lobby server further comprises determining that the computing system in the external network is authorized to join the data conference before joining the at the one computing system to the data conference.

23. The system of claim 22 wherein the lobby server determines that the computing system is authorized by challenging the computing system such that the potential participating computing system may successfully achieve the challenge if they are on an invitation list.

24. A computer-readable storage medium encoded with instructions that, when executed by a processor, cause the lobby server to perform the method recited in claim 1.

\* \* \* \* \*